United States Patent
Lu et al.

(10) Patent No.: US 8,255,930 B2
(45) Date of Patent: Aug. 28, 2012

(54) METHOD AND SYSTEM FOR DYNAMICALLY SWITCHING BETWEEN DIFFERENT DEVICE CONFIGURATIONS

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 805 days.

(21) Appl. No.: 12/408,893

(22) Filed: Mar. 23, 2009

(65) Prior Publication Data

US 2009/0265722 A1  Oct. 22, 2009

(30) Foreign Application Priority Data

Apr. 22, 2008 (CN) .......................... 2008 1 0104621

(51) Int. Cl.
*G06F 3/00* (2006.01)
(52) U.S. Cl. .......................... 719/327; 710/315; 710/14
(58) Field of Classification Search .................. None
See application file for complete search history.

(56) References Cited

U.S. PATENT DOCUMENTS

| | | | |
|---|---|---|---|
| 6,738,834 B1 | 5/2004 | Williams et al. | |
| 7,162,554 B1 | 1/2007 | Cole et al. | |
| 2005/0010649 A1* | 1/2005 | Payne et al. | 709/217 |
| 2009/0177646 A1* | 7/2009 | Pham et al. | 707/5 |
| 2009/0254682 A1* | 10/2009 | Tseng et al. | 710/11 |

FOREIGN PATENT DOCUMENTS

CN 200610002400.1 7/2006

* cited by examiner

*Primary Examiner* — Andy Ho
*Assistant Examiner* — Tuan Dao
(74) *Attorney, Agent, or Firm* — Hammer & Associates, P.C.

(57) ABSTRACT

A method for dynamically switching between different device configurations to improve the utilization of the device and save the cost. The method comprises the steps of obtaining the current configuration information of a device connected to a host; and if the current configuration of the device does not meet the requirements of the host, switching the current configuration of the device to a suitable one for the host. A system for the same is also provided to improve the utilization of the device and save the cost.

17 Claims, 4 Drawing Sheets

METHOD AND SYSTEM FOR DYNAMICALLY SWITCHING BETWEEN DIFFERENT DEVICE CONFIGURATIONS

FIELD OF THE INVENTION

The present invention relates to the information security field, and more particularly, to a method for dynamically switching between different device configurations and a system for the same.

BACKGROUND OF THE INVENTION

More and more daily activities are moved onto the network as the fast development of network and e-commerce technologies in recent years. For example, governmental affairs, banking transactions, and shopping can all be carried out online. Inevitably, some personal information or sensitive information, such as business secrets, is transmitted through the network, and then is possibly associated with some malicious threats (e.g. viruses, hackers, phishing attacks, and other frauds), which can bring losses or damages to legitimate online users.

The information security device is a small hardware device with a processor and a memory. It communicates with the computer through a data communication interface of the computer. It provides functions of key generation, secure storage of keys, preset encryption algorithms, and anti-attack, etc. The calculation relating to keys is fully carried out within the information security device. The information security device typically communicates with the computer through a USB (Universal Serial Bus) interface. Thus, it is often referred to as the USB key or the USB token. The manufacturer of the information security device, the software developer, and the users of the information security can store some information in this device. The advanced information security device is programmable. In other words, the code can be stored in the information security device and be executed then.

Typically, the information security device contains a security-designed chip to perform security functions. In addition to the functions of common embedded microcontrollers, the security-designed chip provides more security functions. Special processing relating to security is applied to the architecture of the security-designed chip during its design phase. For example, the security-designed chip employs a specific security kernel, which provides supports for multiple states with different right definitions, so as to implement management of access to hardware resources, support for randomization of instruction execution time (i.e. instruction cycle), and support for switching of chip states through its interrupt system, so as to implement control over different levels of security to support multi-application. In addition, the kernel may also contain a MMU (Memory Management Unit) for separating logic addresses from physical addresses and mapping addresses, providing supports for the implementation of application (or multi-application) and security from the architecture and forming a hardware firewall along with the different states. The interrupt system can also support passing and switching of interfaces and privileges for system databases and user programs. The security-designed chip can be equipped with a non-volatile memory as its storage medium. Generally, the security-designed chip is made to comply with some standards or is certified by authorities to guarantee its security. These standards and certification include, for example, TCG TPM v1.2, ISO15408, and certain standards of China Password Administration Committee. One of the commercially available security-designed chips is ST19WP18 from STMicroelectronics, which has been successfully certified by EAL5+ (Common Criteria Evaluation Assurance Level 5 plus), which is one of the highest levels for this kind of product in ISO15408 standard.

The operations that can be performed by the information security device mainly include data interacting (encrypting of data to be written to the device, or decrypting of data to be read from the device), authentication information processing, storing/verifying a password, storing/verifying a signature, storing/verifying a certificate, access right managing, and presetting code and executing data computation. Presetting code includes presetting a user software fragment, which cannot be read out of the device and performs data computation within the device, and presetting a software protection application interface function, which is an interface-level function between the device and the applications of software developer.

The hardware identifier is a globally unique identification number defined by the device manufacturer. For the information security device, the hardware identifier is usually stored in the device or labeled on the device. The hardware identifier includes the product number and the manufacturer number. The configuration of the device can also be distinguished by the hardware identifier.

Small Computer System Interface, or SCSI, is a set of interface standards for physically connecting between computers and peripheral devices, providing a higher data transfer rate. The SCSI-based USB device uses the SCSI software protocol only. This simplifies programming of the driver of the USB device. The SCSI-based USB device simulates a USB mass storage device. Thus, the USB device can be driven by the USB flash disk driver integrated with the host. By some means, the USB device can be recognized as a non-drive device by the operating system to avoid the misoperation of users. Alternatively, the USB device can also be designed to be recognized as a real drive by the host. Thus, the software on the USB device can be designed to be automatically played at least on the Win32 platforms, so that it is easier to use.

USB Chip/Smart Card Interface Devices, or CCID, is a standard established by some world-leading IT enterprises, providing a possibility of communicating between the smart-card reader and the host (including the embedded host). The CCID device must be a chip/smart card interface device, which communicates with the host via the USB interface, and communicates with the smartcard in accordance with the ISO 7816 standard. The CCID driver is provided and supported by Microsoft Windows 2000 or higher. Thus, manufacturers are able to develop devices complying with the CCID interface standard easily. In addition, the CCID standard supports PC/SC (Personal Computer/Smart Card) interface calling. A number of open source CCID drivers are also available for other open source operating systems, such as the various versions of Linux.

The HID (Human Interface Device) is a kind of the first USB device configuration supported by the Windows operating system. Applications on the computer using Windows 98 (or higher) can communicate with the HID device, which works with the built-in driver of the operating system. For this reason, the USB device of the HID class can be easily set to work. Some features of the HID class are: 1) the exchanged data resides in a structure known as a "report"; 2) each transaction contains a small-to-medium amount of data; and 3) the device can send information to the computer in an unpredictable time period. Although the data is mostly transferred from the device to the computer, the data transfer from the computer to the HID device is also possible. Any devices that work within the limitations of the HID class can be deemed as the HID device. These devices can transmit data to the computer, and receive device configuration requests from the computer. The HID device can be a low-speed device or a full-speed device.

The descriptor is a formatted block of a data result or information. It is used to recognize the device by the host. A descriptor may contain the overall information regarding the device, or merely the information regarding an element of the device.

In accordance with the USB-SCSI interface standards, byte 0 of the interface descriptor is the length of the descriptor (in bytes) and its value is 09h; byte 1 is the configuration of the descriptor and its value is 04h; byte 4 is the number of the endpoint that is supported; byte 5 is the class code and its value is 08h; byte 6 is the subclass code and its value is 00h; and byte 7 is the protocol code and its value is 50h. In the configuration descriptor, byte 0 is the length of the descriptor (in bytes); and byte 2 is the version number of the SCSI specification. The bytes of other descriptors (e.g. the device descriptor) and other bytes of the interface descriptor and the configuration descriptor should be specified according to the USB protocol.

In accordance with the CCID standard, byte 0 of the interface descriptor is the length of the descriptor (in bytes) and its value is 09h; byte 1 is the fixed endpoint and its value is 04h; byte 4 is the supported endpoint number (excluding endpoint 0) and its value is 02h or 03h; byte 5 is the class code and its value is 0Bh; byte 6 is the subclass code and its value is 00h; and byte 7 is the protocol code and its value is 00h. In the configuration descriptor, byte 0 is the length of the descriptor (in bytes) and its value is 36h; byte 2 is the version number of the CCID specification, which is a decimal represented using a binary code, and its value is 0100h; and byte 52 is PIN support and its value is 00h to 03h. Bytes of other descriptors (e.g. the device descriptor) of the device complying with the CCID standard and other bytes of the interface descriptor and the configuration descriptor should be specified according to the USB protocol.

In accordance with the HID standard, byte 0 of the interface descriptor of the device complying with the HID standard is the length of the descriptor (in bytes) and its value is 09h; byte 1 is the descriptor configuration and its value is 04h; byte 4 is the supported endpoint number and its value is 01h; byte 5 is the class code and its value is 03h; byte 6 is the subclass code and its value is 00h; and byte 7 is the protocol code and its value is 00h. In the configuration descriptor, byte 0 is the length of the descriptor (in bytes); byte 1 is the HID class and its value is 21h; and byte 2 is the release number of the HID specification, which is represented in a binary-coded decimal format (for example, 1.0 is represented as 0100h; and 1.1 is represented as 0110h). Bytes of other descriptors (e.g. the device descriptor) of the device complying with the HID standard and other bytes of the interface descriptor and the configuration descriptor should be specified according to the USB protocol.

In Chinese application No. 200610002400.1, published on Jul. 26, 2006 and entitled "Information Security Apparatus Of Universal Serial Bus Human Interface Device Class and Its Control Method", an information security apparatus based on the USB HID class and its control method are disclosed. The apparatus comprises a master chip with built-in HID descriptors and a USB interface module coupled to the master chip. The portable and easy-to-use apparatus provides powerful functions. HID is broadly applied to removable hard disks, USB flash disks, keyboards, and mice.

The HID and CCID devices provide a lot of advantages. For example, the HID and CCID device are not restricted by user permissions, and in Windows operating system, the HID and CCID devices are accessible to both the user and the administrator. In addition, the user can use the device easily, without requiring installation of its driver; it is not necessary for the user to deal with continuously upgraded versions of the driver and consider the compatibility between the drivers of different products. Furthermore, the user will not face the risk in working with the operating system, which is caused by the driver, and worry about the influence of installing/uninstalling the driver on the system. Normally, if the host system supports the smartcard logon, the CCID protocol is used. Otherwise, the HID protocol is used. Thus, the HID and CCID device are increasingly used in recent years. But a problem emerges accordingly that the HID and CCID devices cannot be played automatically like the USB-SCSI device. In other words, the relevant application programs of the device cannot be installed automatically.

The versions of the kernel of the Linux operating system can be 2.4 or 2.6. The host working with Version 2.4 supports only transfers of packets that are less than 64 bytes in size. The host with Version 2.6 also supports transfer of packets that are greater than 64 bytes in size.

Currently, the information security device is used in a wide range of fields. The internal configuration of the information security device often cannot satisfy the needs of communicating with the host. Devices with various configuration scenarios may be needed. As a result, the cost will be increased. Also, the operation will be more inconvenient.

SUMMARY OF THE INVENTION

To overcome the above-mentioned problems, the present invention provides a method for dynamically switching between different device configurations to improve the utilization of the device and save the cost. The method comprises the steps of:

detecting, by a host, if it has been connected with a device; if so, obtaining the configuration information of the device by the host; otherwise, monitoring, by the host, if a device is being plugged into the host; if the device is plugged, obtaining the configuration information of the device by the host; otherwise, continuing monitoring if a device is being plugged by the host; and after obtaining the configuration information of the device, determining, by the host, if the configuration of the device meets the requirements of the host; if the requirements are met, performing operations according to the configuration by the device; otherwise, transmitting, by the host, an instruction to the device to switch the configuration of the device to a different one that meets the requirements of the host, and changing the current configuration of the device to a suitable one for the requirements of the host and simulating an unplugging operation and then a plugging operation of the device and re-declaring the device according to the new configuration by the device itself, and monitoring, by the host, if a device is being plugged into the host; if the device is plugged, obtaining the configuration information of the device by the host; otherwise, continuing monitoring if a device is being plugged into the host by the host itself.

The configuration information of the device includes a device descriptor, a configuration descriptor, an interface descriptor, and an endpoint descriptor.

The device descriptor indicates the type of the protocol used by the device, including the HID protocol, the CCID protocol, and/or the SCSI protocol.

The endpoint descriptor indicates at least the maximum size of the packet transmitted from the device.

The configuration information of the device is setup previously before the shipment of the device.

The device is a USB information security device.

The simulating an unplugging operation and then a plugging operation of the device is implemented by controlling the level change of the USB signal line by the device.

After simulating an unplugging operation and a plugging operation and re-declaring the device according to the new configuration by the device itself, the device saves the new configuration as the default configuration.

In another aspect, the present invention provides a system for dynamically switching between different device configurations, comprising a host side and a device side, in which:

the host side comprises a first communication module, a device detection module, a device monitoring module, a device configuration acquisition and determination module, and a device configuration switching module;

the first communication module is adapted to communicate between the host side and the device side;

the device detection module is adapted to detect if a device is connected to the host, and if so, start the device configuration acquisition and determination module; otherwise, start the device monitoring module;

the device monitoring module is adapted to monitor if a device is plugged into the host, and if so, start the device configuration acquisition and determination module; otherwise, keep up the monitoring;

the device configuration acquisition and determination module is adapted to obtain the configuration information of the device and determine if the device is using a configuration that meets the requirements of the host, and if so, perform operations on the device according to the configuration; otherwise, start the device configuration switching module; and the device configuration switching module is adapted to transmit an instruction for switching the current configuration to a suitable one that meets the requirements of the host to the device side; and the device side comprises a second communication module, a device unplugging and plugging module, a configuration switching response module, and an information security module;

the second communication module is adapted to communicate from the device side to the host side;

the device unplugging and plugging module is adapted to change the current configuration used by the device to a different one that meets the requirements of the host and simulate an unplugging operation and then a plugging operation of the device, after receiving the instruction for switching the current configuration to a suitable one that meets the requirements of the host from the host side by the device side;

the configuration switching response module is adapted to re-declare the device according to the new configuration after simulating the unplugging operation and the plugging operation by the device unplugging and plugging module; and the information security module is adapted to perform information security operations after it has been testified that the configuration of the device meets the requirements of the host.

The device side further comprises a memory module adapted to store the configuration of the device as a default configuration, after simulating the unplugging operation and the plugging operation by the device unplugging and plugging module and re-declaring the device according to the new configuration by the configuration switching response module.

The memory module is a non-volatile memory.

The configuration information obtained by the device configuration acquisition and determination module includes a device descriptor, a configuration descriptor, an interface descriptor, and an endpoint descriptor.

The device descriptor indicates the type of the protocol used by the device, including the HID protocol, the CCID protocol, and/or the SCSI protocol.

The endpoint descriptor indicates at least the maximum size of the packet transmitted from the device.

As mentioned above, the present invention provides a way to improve the utilization of the device and save the cost by dynamically switching between different configurations of the device.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the following embodiments and the drawings below.

Figure 1:
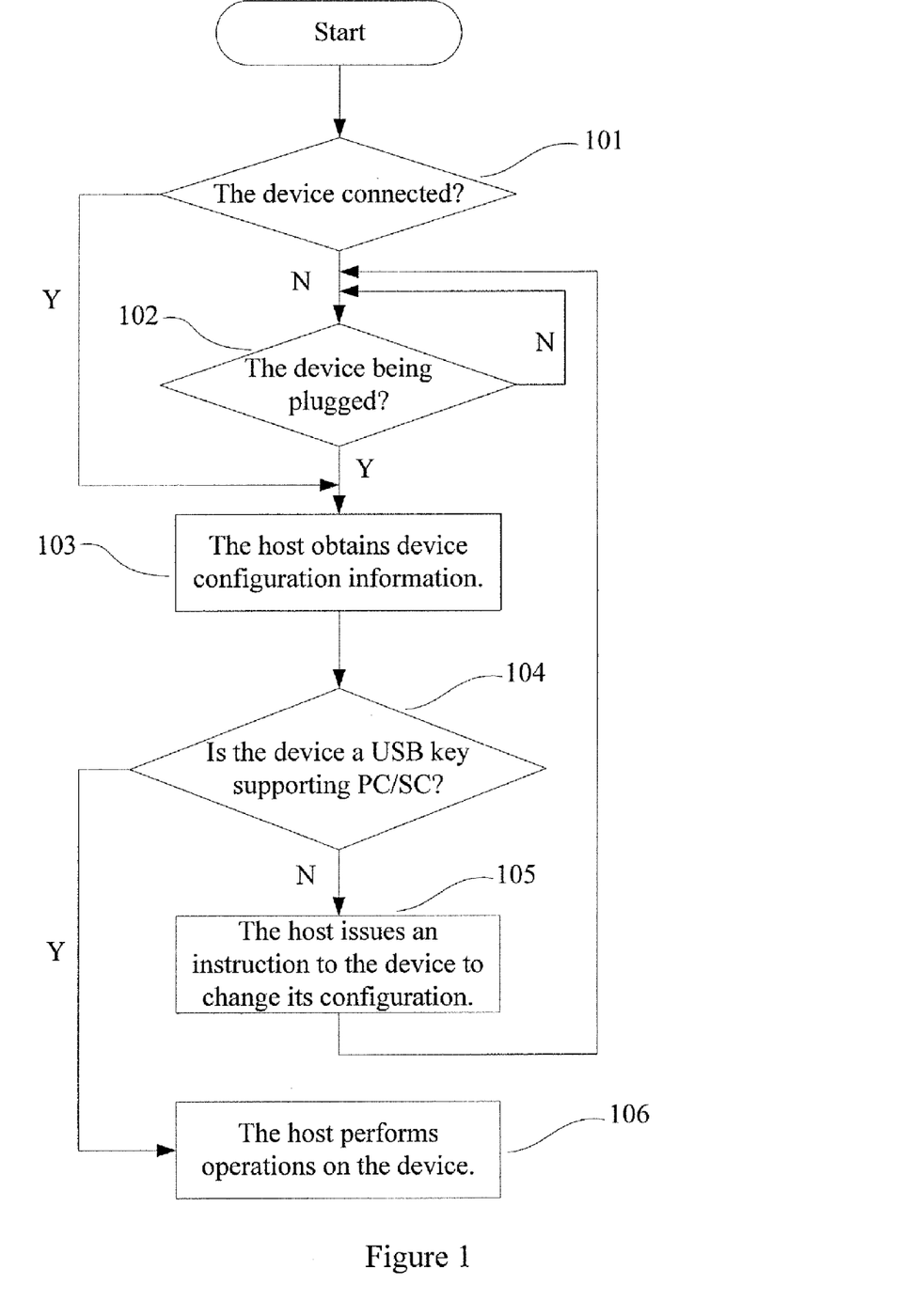
FIG. 1 is a host side flow diagram of dynamically switching between different device configurations.

Referring to FIG. 1, the present invention provides a method for dynamically switching between different device configurations, which comprises the following steps:

Step 101: the host detects if a device has been connected to it by means of enumeration, and if so, the step 103 is performed; otherwise, the step 102 is performed.

Step 102: the host monitors if a device is being plugged into it by means of dynamic detection, and if so, the step 103 is performed; otherwise, the host continues monitoring the situation.

Step 103: the host obtains the configuration information of the device.

At this step, the host will read some information from the device, including the device descriptor, the configuration descriptor, the interface descriptor, and the endpoint descriptor.

The device descriptor consists of the type number the device descriptor, the USB version number, the device class code assigned by the USB, the subclass code assigned by the USB, the device protocol code assigned by the USB, the maximum size of the packet for endpoint 0, the manufacturer number, the product number, the device serial number, the manufacturer string index, the product string index, the device serial number string index, and the possible number of configurations.

The configuration descriptor consists of the type number of the configuration descriptor, the size of all data returned for the configuration, the number of interfaces supported for the configuration, the values of the parameters required for Set-Configuration command, the value of the index of the string depicting the configuration, the selection of power supply, and the maximum current drawn from the bus by the device.

The interface descriptor consists of the type number of the interface descriptor, the number of the interface, the number of the spare interface descriptor, the number of endpoints used by the interface (endpoint 0 not included), the interface type, the interface subclass type, the protocol used by the interface, and the value of the index of the string depicting the interface.

The endpoint descriptor consists of the type number of the endpoint descriptor, the endpoint address and I/O attributes, the transfer type attributes of the endpoint, the maximum size of the packet received by or transmitted from the endpoint, and the interval for polling the endpoint by the host.

Step 104: the host determines if the device type is a USB key that supports the PC/SC software interface protocol according to the current configuration information provided by the device, and if so, Step 106 is performed; otherwise, Step 105 is performed.

Some USB keys must communicate with the host via a protocol that supports PC/SC software interfaces. The optional device types are SCSI protocol device, HID protocol device, CCID protocol device, etc. Some of these devices do not support the PC/SC software interface protocol.

Particularly, the host determines if the device configuration obtained in Step 103 matches the required device descriptor via a program at this step.

Before the device is sent out, the manufacturer writes a number of configuration codes to it, including the manufacturer number, the product number, and the protocol type. The manufacturer number is unique to identify the manufacturer of the device. There may be several product numbers. But only one of the product numbers is recognized as a product type by the host at a time. For example, 0811 represents the USB key that supports the PC/SC software interface protocol, and 0812 represents the key system. The protocol type can be the SCSI protocol device, the HID protocol device, and/or the CCID protocol device. The device provides only one of the protocol configurations (the default configuration) to the host. In the communication process between the device and the host, the communication between the hardware protocol and the application must be implemented via a particular type of software interface. But the particular type of software interface is not supported for all hardware protocols. Thus, the device type must be changed to support the software interface. For example, if the PC/SC software interface which is supported for the CCID protocol only is installed on the host, the default configuration of any of the SCSI protocol, the HID protocol, and other private driver protocols must be changed to the CCID protocol to implement communication between the device and the host.

Step 105: the host issues an instruction requiring the device changes to use the specified configuration type; the device changes the current configuration to another one that supports the PC/SC software interface, and then simulates an unplugging operation and a plugging operation and re-declares itself according to the new configuration; then Step 102 is performed.

At this step, the device changes the device descriptor, the configuration descriptor, the interface descriptor, and the endpoint descriptor in response to the instruction received from the host, and simulates an unplugging operation and a plugging operation.

In particular, the process of simulating an unplugging operation and a plugging operation is implemented by equipping the device with a USB resetting module, which is used to control the universal serial bus of the device to simulate an unplugging and plugging event of the information security device by controlling the level change of the USB signal line.

In the present embodiment, the instruction issued by the host is an APDU (Application Protocol Data Unit) control command. The APDU complies with the ISO 7816-4 protocol. It is a data format for communicating between the applets (on the card) and the master applications (off the card) for both command and response.

The APDU for switching the device type is a command-format APDU. The command-format APDU includes a compulsory 4-byte header (CLA, INS, P1, and P2) and an optional variable-length body (Lc, Data, and Le) like the following:

| Command Header | | | | Command Body | | |
|---|---|---|---|---|---|---|
| CLA | INS | P1 | P2 | Lc | Data | Le |

The command header is the coding of the command. The Lc is the length of the data in the body. The Data is the data to be transmitted. The Le is the maximum number of bytes in the data field of the response APDU that is expected. If it is 0, the maximum size of response data is requested. If it is 1, the maximum number of bytes of data is 256.

In particular, the APDU can be designed as follows: 84 F1 00 00 04 MAC—change the USB key to communicate using the HID protocol; 84 F1 00 01 04 MAC–change the USB key to communicate using the SCSI protocol; and 84 F1 00 02 04 MAC—change the USB key to communicate using the CCID protocol.

In this embodiment, the last APDU, 84 F1 00 02 04 MAC, is used to change the device to CCID type.

At the step 105, the required configuration type is saved as a default after the device simulates the unplugging operation and the plugging operation and re-declares itself according to the new configuration. Thus, when reconnected to the host after a disconnection, the device is recognized by the host as compliant with its requirements. In this case, configuration switching is not needed.

Step 106: the host performs operations on the device according to the configuration compliant with its requirements.

In this embodiment, the operating system of the host can be Windows, Linux, Unix, or Mac OS; and the device is a USB information security device.

Figure 2:
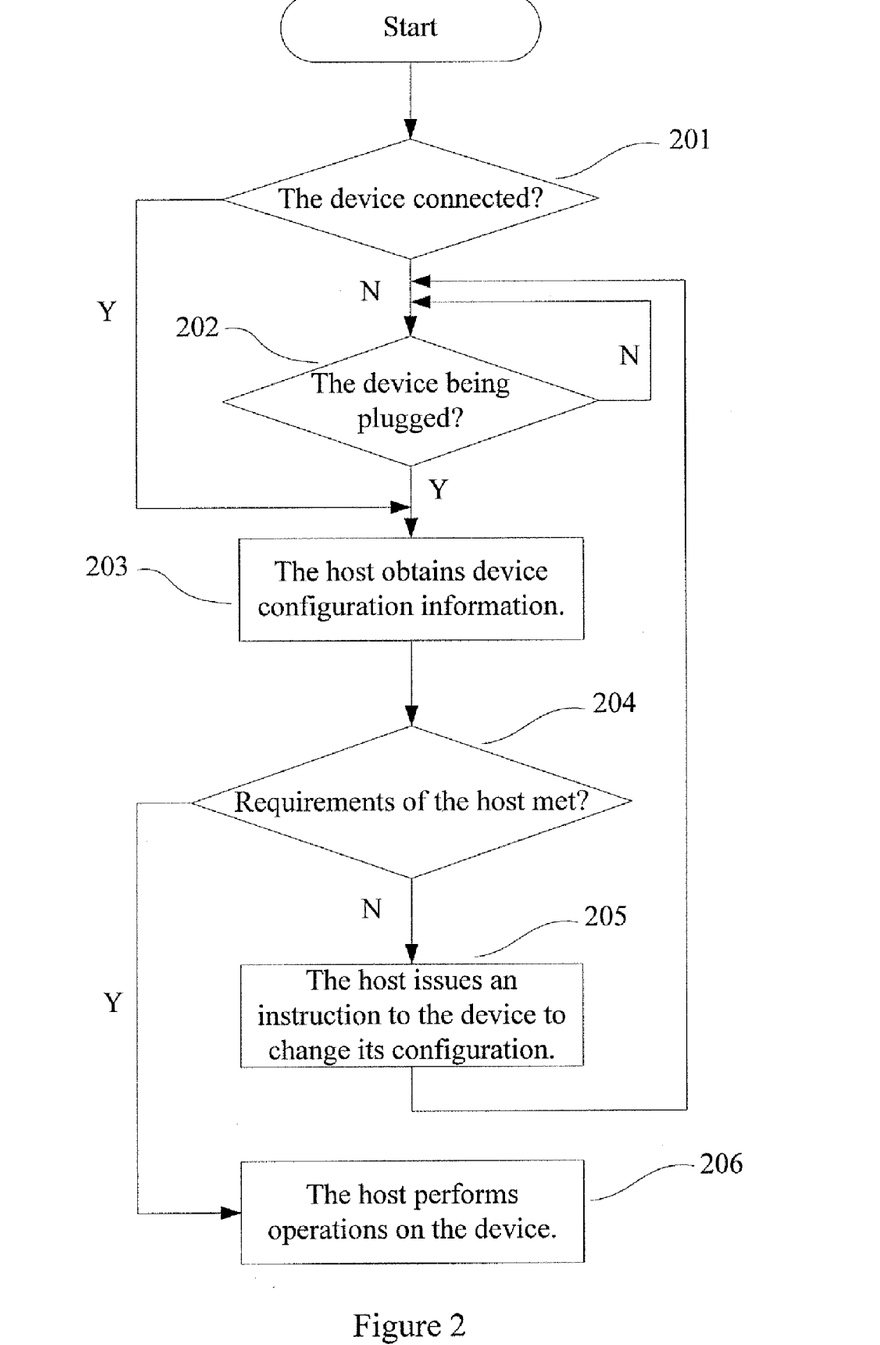
FIG. 2 is a second host side flow diagram of dynamically switching between different device configurations.

FIG. 2 is a diagram of another embodiment of the present invention providing a method for dynamically switching between different device configurations. The method comprises the following steps:

Step 201: the host detects if a device has been connected to it by means of enumeration, and if so, Step 203 is performed; otherwise, Step 202 is performed.

Step 202: the host monitors if a device is being plugged into it by means of dynamic detection, and if so, Step 203 is performed; otherwise, the host continues monitoring the situation.

Step 203: the host communicates with the device to obtain its configuration information via 64-byte packets.

At this step, the host will read some information from the device, including the device descriptor, the configuration descriptor, the interface descriptor, and the endpoint descriptor.

The device descriptor consists of the type number of the device descriptor, the USB version number, the device class code assigned by the USB, the subclass code assigned by the USB, the device protocol code assigned by the USB, the maximum size of the packet for endpoint 0, the manufacturer number, the product number, the device serial number, the manufacturer string index, the product string index, the device serial number string index, and the possible number of configurations.

The configuration descriptor consists of the type number of the configuration descriptor, the size of all data returned for the configuration, the number of interfaces supported for the configuration, the values of the parameters required for Set Configuration command, the value of the index of the string depicting the configuration, the selection of power supply, and the maximum current drawn from the bus by the device.

The interface descriptor consists of the type number of the interface descriptor, the number of the interface, the number of the spare interface descriptor, the number of endpoints used by the interface (endpoint 0 not included), the interface type, the interface subclass type, the protocol used by the interface, and the value of the index of the string depicting the interface.

The endpoint descriptor consists of the type number of the endpoint descriptor, the endpoint address and I/O attributes, the transfer type attributes of the endpoint, the maximum size of the packet received by or transmitted from the endpoint, and the interval for polling the endpoint by the host.

Step 204: the host determines if the device allows packets longer than 64 bytes each in accordance with the current configuration information provided by the device, and if so, Step 206 is performed; otherwise, Step 205 is performed.

The length of the packet that is allowed varies depending on the version of the Linux operating system. If the host is running Linux 2.4, only transfers of a packet less than 64 bytes are supported. But for Linux 2.6, transfers of a packet longer than 64 bytes are also supported. The version of the operating system used by the host is fixed. However, the configuration type of the device can be changed to support transfers of the packet with a different size. Thus, if the host is using Linux 2.6 and only transfers of a packet equal to or less than 64 bytes are supported for the configuration type of the device, the host can only communicate with the device via packets equal to or less than 64 bytes each. The transfer rate of data is no doubt very low. By switching the configuration type of the device to another one that allows 64-byte-packet transfers, the transfer rate of data between the host and the device is improved remarkably.

Step 205: the host issues an instruction requiring the device changes to use the specified configuration type; the device changes the current configuration to another one that meets the requirements of the Linux 2.6 kernel of the host, and then simulates an unplugging operation and a plugging operation and re-declares itself according to the new configuration; then Step 202 is performed.

At this step, the device changes the device descriptor, the configuration descriptor, the interface descriptor and the endpoint descriptor in response to the instruction received from the host, and simulates an unplugging operation and a plugging operation. The device descriptor provides the current configuration state of the device.

In particular, the process of simulating an unplugging operation and a plugging operation is implemented by equipping the device with a USB resetting module, which is used to control the universal serial bus of the device to simulate an unplugging and plugging event of the information security device by controlling the level change of the USB signal line.

In the present embodiment, the instruction issued by the host is an APDU (Application Protocol Data Unit) control command. The APDU complies with the ISO 7816-4 protocol. It is a data format for communicating between the applets (on the card) and the master applications (off the card) for both command and response.

The APDU for switching the device type is a command-format APDU. The command-format APDU includes a compulsory 4-byte header (CLA, INS, P1, and P2) and an optional variable-length body (Lc, Data, and Le) like the following:

| Command Header | | | | Command Body | | |
| --- | --- | --- | --- | --- | --- | --- |
| CLA | INS | P1 | P2 | Lc | Data | Le |

The command header is the coding of the command. The Lc is the length of the data in the body. The Data is the data to be transmitted. The Le is the maximum number of bytes in the data field of the response APDU that is expected. If it is 0, the maximum size of response data is requested. If it is 1, the maximum number of bytes of data is 256.

In particular, the APDU for switching the size of the packet communicated between the host and the device can be designed as follows: 84 F1 01 00 06 XX XX MAC—change the USB key to communicate with the host via packets with length of XX XX (two bytes) bytes each.

For Linux 2.6 kernel, the APDU, 84 F1 01 00 06 10 00 MAC, can be used to change the device to use packets that are 4096 (0x1000) bytes long each to communicate with the host.

At Step 205, the required configuration type is saved as a default after the device simulates the unplugging operation and the plugging operation and re-declares itself according to the new configuration. Thus, when reconnected to the host after a disconnection, the device is recognized by the host as compliant with its requirements. In this case, configuration switching is not needed.

Step 206: the host performs operations on the device according to the configuration that meets its requirements.

In this embodiment, the operating system of the host is Linux; and the device is a USB information security device.

Figure 3:
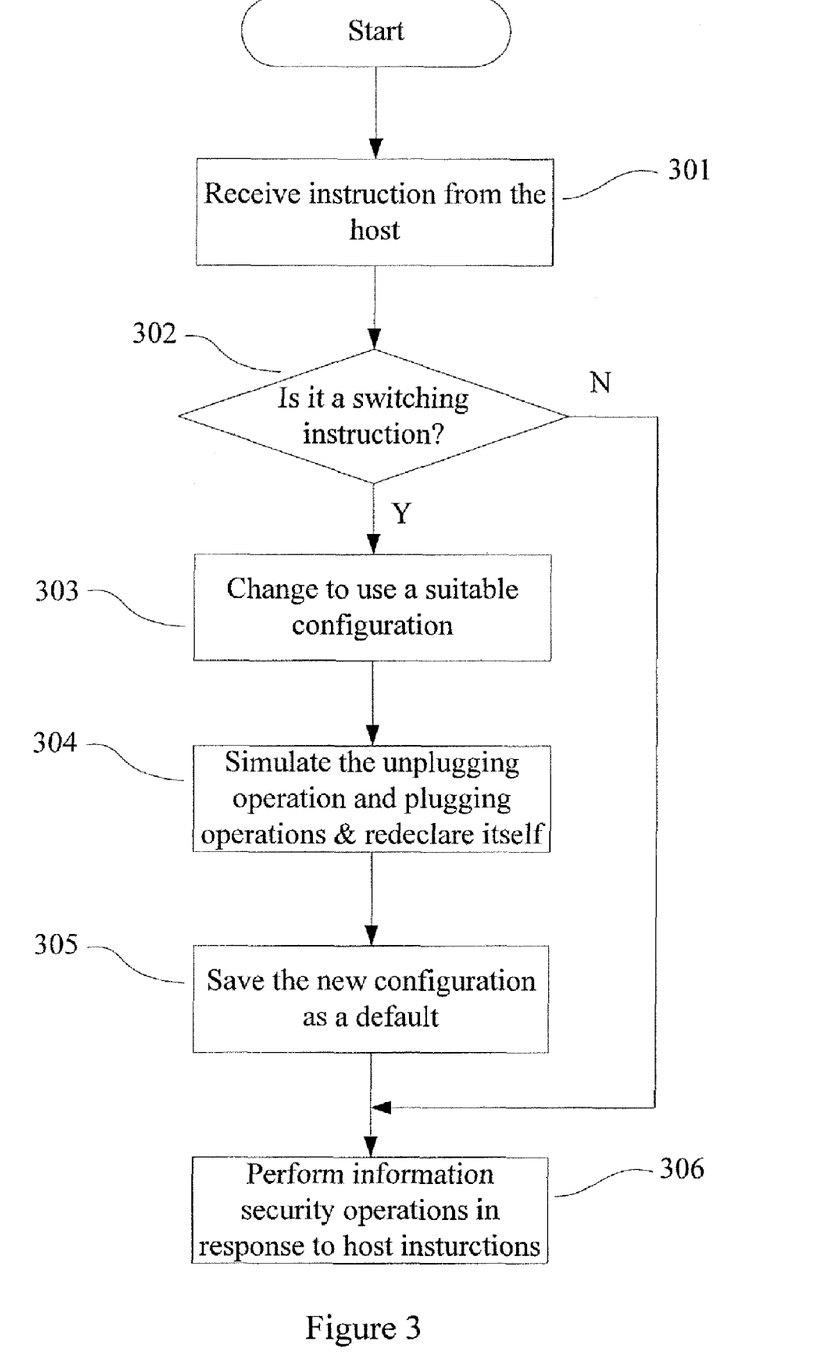
FIG. 3 is a third host side flow diagram of dynamically switching between different device configurations.

Referring to FIG. 3, the device does as follows in response to the operations performed by the host as in above-described two embodiments:

Step 301: receive the instruction from the host.

Step 302: determine if the instruction requires it change its configuration, and if so, Step 303 is performed; otherwise, Step 306 is performed.

Step 303: change to use a configuration that meets the requirements of the host in response to the instruction.

By modifying the protocol flag previously written to the device, the configuration of the device can be switched to another one. For example, if it has been previously specified that if the protocol flag is set to 0, the SCSI or HID protocol is used and if the protocol flag is set to 1, the CCID protocol is used in the first embodiment, the device is changed to use the CCID protocol by modifying the flag to 1 after receiving the instruction for switching configuration.

Step 304: simulate the unplugging operation and plugging operation to the host and re-declare itself.

Step 305: save the new configuration as a default (optional). If the step 305 is not performed, the device must be changed to use the new configuration once more when it is connected to the host again after disconnected with the host.

Step 306: perform information security operations in response to instructions received from the host.

The operations that can be performed by the information security device mainly include data interacting (encrypting of data to be written to the device, or decrypting of data to be read from the device), authentication information processing, storing/verifying a password, storing/verifying a signature, storing/verifying a certificate, access right management, and presetting code and executing data computation. Presetting code includes presetting a user software fragment, which cannot be read out of the device and performs data computation within the device, and presetting a software protection application interface function, which is an interface-level function between the device and the applications of software developer.

Figure 4:
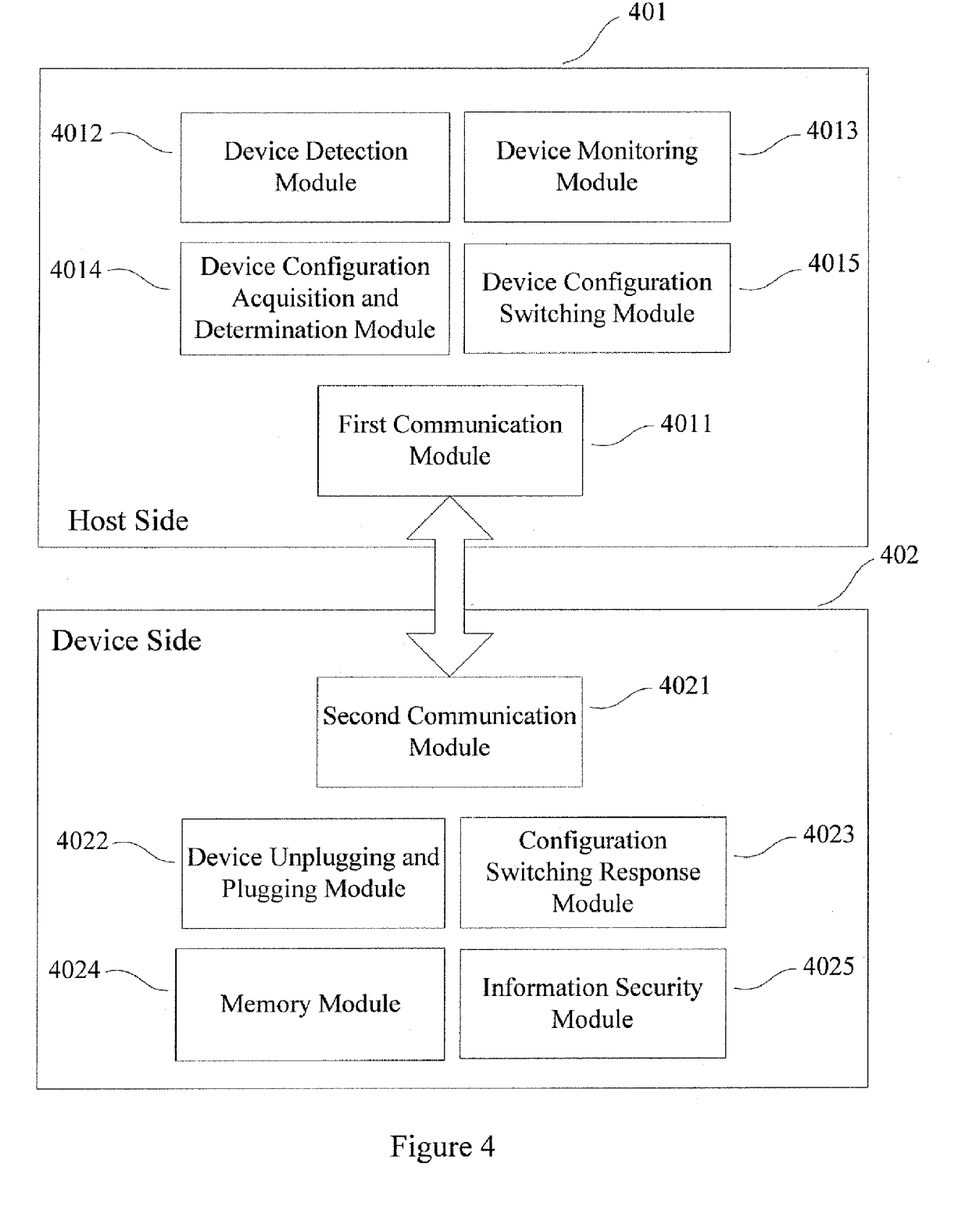
FIG. 4 is a block schematic of the system for dynamically switching between different device configurations.

Referring to FIG. 4, the present invention provides a system 400 for dynamically switching between different device configurations. The system comprises a host side 401 and a device side 402, in which:

the host side 401 comprises a first communication module 4011, a device detection module 4012, a device monitoring module 4013, a device configuration acquisition and determination module 4014, and a device configuration switching module 4015;

the first communication module 4011 is used to communicate between the host side and the device side;

the device detection module 4012 is used to detect if a device is connected to the host, and if so, start the device configuration acquisition and determination module 4014; otherwise, start the device monitoring module 4013;

the device monitoring module 4013 is used to monitor if a device is plugged into the host, and if so, start the device configuration acquisition and determination module 4014; otherwise, keep up the monitoring;

the device configuration acquisition and determination module 4014 is used to obtain the configuration information of the device and determine if the device is using a configuration that meets the requirements of the host, and if so, perform operations on the device according to the configuration; otherwise, start the device configuration switching module 4015; the configuration information obtained by the device configuration acquisition and determination module 4014 includes a device descriptor, a configuration descriptor, an interface descriptor, and an endpoint descriptor; the device descriptor indicates the type of the protocol used by the device (e.g. the HID protocol, the CCID protocol, and/or the SCSI protocol); the endpoint descriptor indicates at least the maximum size of the packet transmitted from the device; and the device configuration switching module 4015 is used to transmit an instruction for switching the current configuration to a suitable one that meets the requirements of the host to the device side when the configuration of the device does not meet the requirements of the host according to the analysis of the device configuration acquisition and determination module 4014; and the device side 402 is a USB information security device, which comprises a second communication module 4021, a device unplugging and plugging module 4022, a configuration switching response module 4023, and an information security module 4025;

the second communication module 4021 is used to communicate from the device side to the host side;

the device unplugging and plugging module 4022 is used to change the current configuration used by the device to a different one that meets the requirements of the host and simulate an unplugging operation and then a plugging operation of the device, after receiving the instruction for switching the current configuration to a suitable one that meets the requirements of the host from the host side 401 by the device side 402;

the configuration switching response module 4023 is used to re-declare the device according to the new configuration after simulating the unplugging operation and the plugging operation by the device unplugging and plugging module 4022; and the information security module 4025 is used to perform information security operations after it has been testified that the configuration of the device meets the requirements of the host. The operations that can be performed by the information security device mainly include data interacting (encrypting of data to be written to the device, or decrypting of data to be read from the device), authentication information processing, storing/verifying a password, storing/verifying a signature, storing/verifying a certificate, access right management, and presetting code and executing data computation. Presetting code includes presetting a user software fragment, which cannot be read out of the device and performs data computation within the device, and presetting a software protection application interface function, which is an interface-level function between the device and the applications of software developer.

The device side 402 may further comprise a memory module 4024, which is used to store the configuration of the device as a default configuration, after simulating the unplugging operation and the plugging operation by the device unplugging and plugging module and re-declaring the device according to the new configuration by the configuration switching response module, so that the changed configuration can be used directly by the device when it is connected to the host next time. The memory module is a non-volatile memory.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for dynamically switching between different device configurations, wherein said method comprises the steps of:

detecting, by a host, if it has been connected with a device; if so, obtaining the configuration information of the device by the host; otherwise, monitoring, by the host, if the device is being plugged into the host; if the device is plugged, obtaining the configuration information of the device by the host; otherwise, continuing monitoring if the device is being plugged by the host; and after obtaining the configuration information of the device, determining, by the host, if the configuration information of the device meets the requirements of the host; if the requirements are met, performing operations according to the configuration information by the device; otherwise, transmitting, by the host, an instruction to the device to switch the configuration information of the device to a different one that meets the requirements of the host, changing the current configuration information of the device to a suitable one for the requirements of the host, simulating an unplugging operation and then a plugging operation of the device, re-declaring the device according to the new configuration information by the device itself, then monitoring, by the host, if the device is being plugged into the host; if the device is plugged, obtaining the configuration information of the device by the host; otherwise, continuing monitoring if the device is being plugged into the host by the host itself.

2. The method of claim 1, wherein the configuration information of the device includes a device descriptor, a configuration descriptor, an interface descriptor, and an endpoint descriptor.

3. The method of claim 2, wherein the device descriptor indicates a type of the protocol used by the device, including the Human Interface Device (HID) protocol, the Chip/Smart Card Interface Device (CCID) protocol, and/or the Small Computer System Interface (SCSI) protocol.

4. The method of claim 2, wherein the endpoint descriptor indicates a maximum size of a packet transmitted from the device.

5. The method of claim 1, wherein the configuration information of the device is setup previously before the device is shipped.

6. The method of claim 1, wherein the device is a Universal Serial Bus (USB) information security device.

7. The method of claim 1, wherein said simulating an unplugging operation and then a plugging operation of the device is implemented by controlling a level change of a Universal Serial Bus (USB) signal line by the device.

8. The method of claim 1, wherein after simulating an unplugging operation and a plugging operation and re-declaring the device according to the new configuration by the device itself, the device saves the new configuration information as the default configuration.

9. A system for dynamically switching between different device configurations, wherein said system comprises a host side and a device side, in which:
the host side comprises a first communication module, a device detection module, a device monitoring module, a device configuration acquisition and determination module, and a device configuration switching module;
the first communication module is adapted to communicate between the host side and the device side;
the device detection module is adapted to detect if a device is connected to the host, and if so, starting the device configuration acquisition and determination module; otherwise, starting the device monitoring module;
the device monitoring module is adapted to monitor if the device is plugged into the host, and if so, starting the device configuration acquisition and determination module; otherwise, keeping up the monitoring;
the device configuration acquisition and determination module is adapted to obtain the configuration information of the device and determine if the device is using a configuration information that meets the requirements of the host, and if so, performing operations on the device according to the configuration information;
otherwise, starting the device configuration switching module; and
the device configuration switching module is adapted to transmit an instruction for switching the current configuration information to a suitable one that meets the requirements of the host to the device side; and
the device side comprises a second communication module, a device unplugging and plugging module, a configuration switching response module, and an information security module;

the second communication module is adapted to communicate between the device side and the host side;
the device unplugging and plugging module is adapted to change the current configuration information used by the device to a different one that meets the requirements of the host and simulate an unplugging operation and then a plugging operation of the device, after receiving the instruction for switching the current configuration information to a suitable one that meets the requirements of the host from the host side by the device side;
the configuration switching response module is adapted to re-declare the device according to the new configuration information after simulating the unplugging operation and the plugging operation by the device unplugging and plugging module; and
the information security module is adapted to perform information security operations after it has been testified that the configuration information of the device meets the requirements of the host.

10. The system of claim 9, wherein the device side further comprises a memory module adapted to store the configuration information of the device as a default configuration, after simulating the unplugging operation and the plugging operation by the device unplugging and plugging module and re-declaring the device according to the new configuration information by the configuration switching response module.

11. The system of claim 10, wherein the memory module is a non-volatile memory.

12. The system of claim 9, wherein the configuration information obtained by the device configuration acquisition and determination module includes a device descriptor, a configuration descriptor, an interface descriptor, and an endpoint descriptor.

13. The system of claim 10, wherein the configuration information obtained by the device configuration acquisition and determination module includes a device descriptor, a configuration descriptor, an interface descriptor, and an endpoint descriptor.

14. The system of claim 12, wherein the device descriptor indicates the type of the protocol used by the device, including Human Interface Device (HID) protocol, the Chip/Smart Card Interface Device (CCID) protocol, and/or the Small Computer System Interface (SCSI) protocol.

15. The system of claim 13, wherein the device descriptor indicates the type of the protocol used by the device, including Human Interface Device (HID) protocol, the Chip/Smart Card Interface Device (CCID) protocol, and/or the Small Computer System Interface (SCSI) protocol.

16. The system of claim 12, wherein the endpoint descriptor indicates a maximum size of a packet transmitted from the device.

17. The system of claim 13, wherein the endpoint descriptor indicates a maximum size of a packet transmitted from the device.

* * * * *